United States Patent
Liu

(10) Patent No.: US 6,901,059 B2
(45) Date of Patent: May 31, 2005

(54) LOW NOISE HYBRID CIRCUIT FOR COMMUNICATIONS SYSTEMS USING TIME DIVISION MULTIPLEXING

(75) Inventor: Dongtai Liu, Fremont, CA (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 10/796,244

(22) Filed: Mar. 8, 2004

(65) Prior Publication Data

US 2004/0202193 A1 Oct. 14, 2004

Related U.S. Application Data

(60) Provisional application No. 60/453,562, filed on Mar. 10, 2003.

(51) Int. Cl.[7] .............................. H04B 7/212
(52) U.S. Cl. ................. 370/321; 370/347; 370/442; 375/222; 379/399.01
(58) Field of Search .................. 370/321, 319, 370/442, 347, 352, 503, 353, 356, 493, 494, 495, 496, 498, 77, 95.3; 725/105; 327/210, 391, 437, 222; 375/285, 222, 220, 219; 379/399.01, 156, 165; 365/185.01, 185.23

(56) References Cited

U.S. PATENT DOCUMENTS

| | | | |
|---|---|---|---|
| 4,932,022 A | * 6/1990 | Keeney et al. | ............... 370/271 |
| 6,650,177 B1 | * 11/2003 | Tan | ............................ 327/553 |
| 6,654,409 B1 | * 11/2003 | Scott et al. | .................. 375/220 |
| 6,741,120 B1 | * 5/2004 | Tan | ............................ 327/555 |
| 6,765,931 B1 | * 7/2004 | Rabenko et al. | ............ 370/493 |
| 2001/0033583 A1 | * 10/2001 | Rabenko et al. | ............ 370/503 |
| 2002/0061012 A1 | * 5/2002 | Thi et al. | ..................... 370/352 |

FOREIGN PATENT DOCUMENTS

| | | | | |
|---|---|---|---|---|
| JP | 02022926 A | * | 1/1990 | ............ H03M/1/00 |
| JP | 03139943 A | * | 6/1991 | ........... H04L/29/08 |
| JP | 04157860 A | * | 5/1992 | .......... H04M/11/00 |
| JP | 05110803 A | * | 4/1993 | ............ H04N/1/32 |
| JP | 06077962 A | * | 3/1994 | ........... H04L/12/28 |

\* cited by examiner

*Primary Examiner*—Jamal A. Fox
(74) *Attorney, Agent, or Firm*—Felix L. Fischer

(57) ABSTRACT

A modem for Time Division Multiplexed Digital Subscriber Line applications eliminates the requirements for a Hybrid Balanced Network and employs low noise termination of the load resistors using switchable transistors for saturation of the line driver or a switchable parallel balancing impedance activated synchronously with the receive time slot of the TDM protocol.

5 Claims, 3 Drawing Sheets

LOW NOISE HYBRID CIRCUIT FOR COMMUNICATIONS SYSTEMS USING TIME DIVISION MULTIPLEXING

REFERENCE TO RELATED APPLICATIONS

This application claims priority of U.S. Provisional Application Ser. No. 60/453,562 filed on Mar. 10, 2003 and having the same title as the present application.

BACKGROUND OF THE INVENTION

1. Field of the Invention

This invention relates generally to the field of modems for Digital Subscriber Line (DSL) applications. More particularly, the invention provides a hybrid architecture modem for use in Time Division Multiplexed (TDM) DSL which eliminates the requirement for a balanced network.

2. Description of Related Art

Most xDSL systems operate with Frequency Domain Duplex (FDD) or Frequency Domain Multiplex (FDM) signal transmission. The transmit and receive signals for these systems travel concurrently over the same twisted pair cabling. To be able to receive the incoming signal while transmitting the outgoing signal, modems typically employ a trans-hybrid balanced network. In such a modem, the line driver serves as both the source for the transmitting signal and the terminator for the receive signal.

FIG. 1 shows a typical prior art device. Resistors 2 and 4, having resistance values R1 and R2 respectively, are the loading resistors for the twisted pair line 6 and are terminated by the line driver 8. Inductors 10, 12, 14 and 16 having impedances Za, Zb, Zc, and Zd form the hybrid balanced network (HBN) that separates the receive signal from the mixed signals on the twisted pair. The HBN not only separates the receive and transmit signals, but also helps eliminate the appearance of noise from the line driver on the receive output. Noise created by the line driver is usually random in nature and could lower the receiver's signal to noise ratio (S/N) if not suppressed. Typically, the HBN can attenuate the transmit signal and noise by 20 dB on the receive output lines 18; enough to eliminate the effect of line driver noise on the receive S/N.

The penalty of using the HBN is that the receive signal is also attenuated by about 3.5 dB. This degrades the receive signal's noise floor and makes the design of the receiver more difficult. Another side effect of the HBN is that it increases the line driver's power dissipation. A trade-off exists between thermal noise and the extra power dissipation. A ten percent increase in line driver power consumption is not uncommon due to the HBN.

In many modems, so called "active termination" schemes are used in the hybrid circuit to increase power efficiency. These schemes use active impedance to replace a portion of the line loading resistor so that smaller resistance values can be used, resulting in reduced waste in transmitter power. A typical actively terminated DSL modem hybrid circuit is shown in FIG. 2.

Active termination is created by the addition of resistors 20, 22, 24 and 26 having resistances R3, R4, R5 and R6, which provide feedback from the HBN nodes to the line driver. The degree of active impedance synthesis can be measured by the active termination ratio (ATR) defined as (R1+R2)/Zo where Zo is the nominal line impedance. In most DSL loops Zo=100 ohms. Conventionally R1=R2=Zo/2 is required to properly terminate the line. In an active termination hybrid R1=R2<Zo to reduce line driver power consumption. In the extreme case of R1=R2=0, 50% of the line driver power dissipation is saved. In practical embodiments, the ATR ranges from 0.1 to 0.5.

However, introduction of active termination further attenuates the receive signal in the modem. This attenuation is roughly proportional to the ATR. An ATR of 0.2 saves power by 40% but also results in an additional 14 dB attenuation of the receive signal, making the total noise floor 17.5 dB worse. The DSL line background noise is −140 dBm. The exemplary active impedance modem changes the effective noise floor to −157.5 dBm, making the receive amplifier design difficult and costly.

It is therefore desirable to employ a modem architecture for DSL, which does not include a HBN, to reduce the noise floor degradation to simplify amplifier design requirements for the receiver.

SUMMARY OF THE INVENTION

A modem for a Digital Subscriber Line (DSL) employing Time-Division Multiplexing (TDM) protocol as implemented using the present invention incorporates a line driver having inputs for receiving a transmit signal and outputs for connection to a twisted pair line with pigtails for connecting the twisted pair line to a receiver. Load resistors are coupled intermediate the line driver outputs and the receiver and a saturation loading circuit for the line driver or parallel active impedance are used for terminating the load resistors in a low noise termination responsive to a switching signal. The switching signal is generated synchronous with the receive time slot of the TDM protocol

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

The present invention employs ad Time Division Multiplexed (TDM) DSL system where the transmit and receive signals occur on the same twisted pair line in different time slots. In a TDM application, physical separation of transmit (Tx) and receive (Rx) signals are not necessary as in an FDM system. The Rx signal is tapped directly from the line without the use of an HBN. Consequently, there is no resultant attenuation of the signal. However, if the Rx signal is tapped from the line directly, a significant portion of the line driver noise will be included. A typical line driver produces around −135 to −145 dBm noise and will produce irrecoverable S/N degradation by up to 5 dB.

Figure 1:
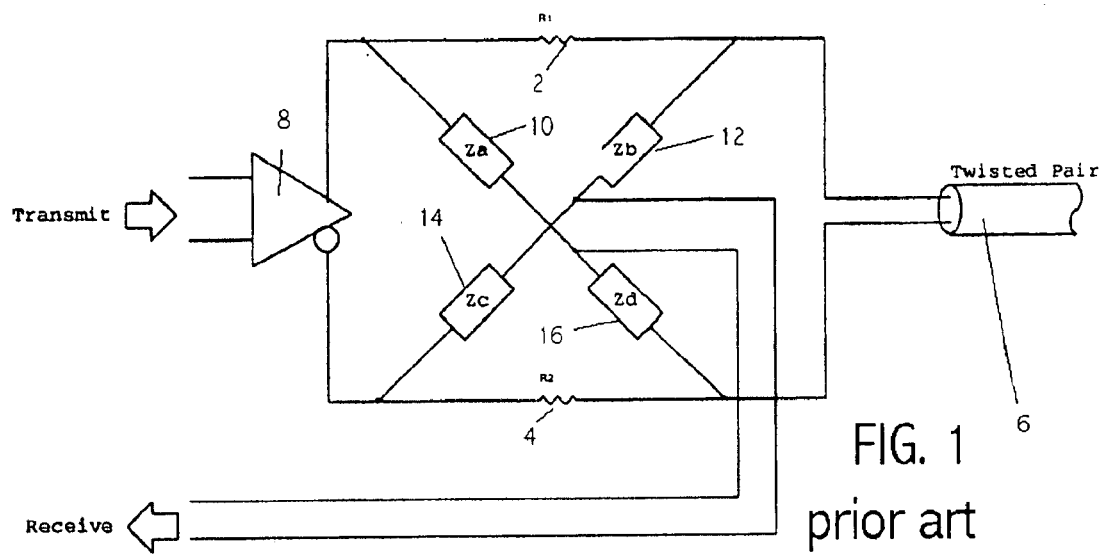
FIG. 1 is a schematic depiction of prior art DSL modem employing a HBN.
Figure 2:
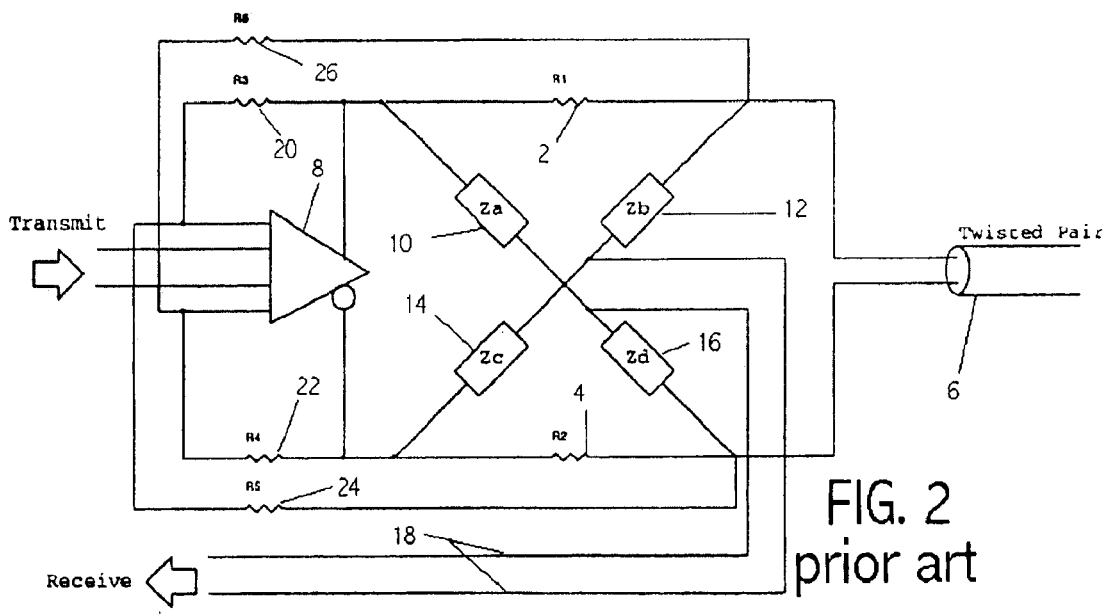
FIG. 2 is a schematic of a prior art DSL modem with and HBN and active impedance for reduction of line driver power consumption.
Figure 3:
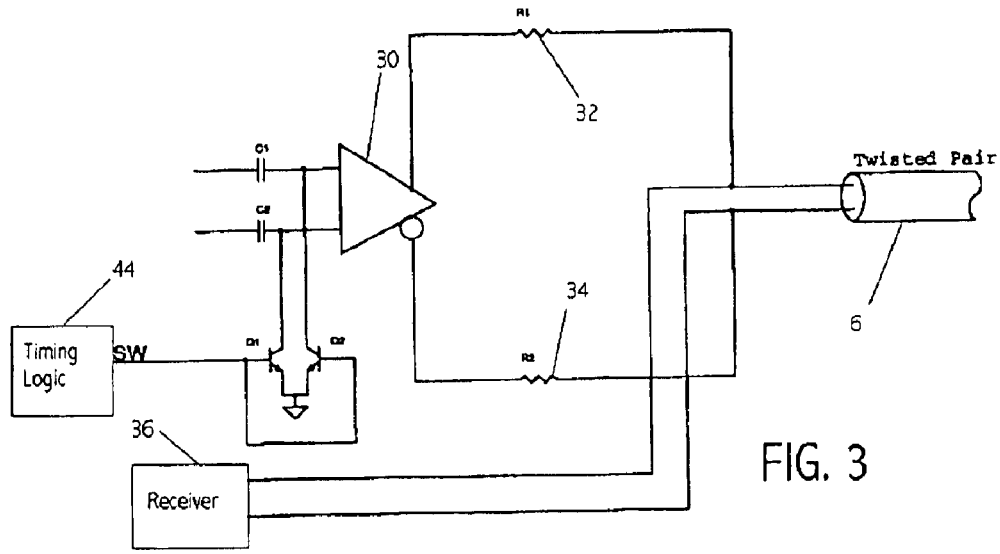
FIG. 3 is a schematic for a first embodiment of the present invention employing passive termination.

Referring to the drawings, FIG. 3 illustrates a first embodiment of the invention. A line driver 30 receives the Tx signal on its inputs. A twisted pair cable 6 interconnects the modems in the network. In this embodiment, loading resistors 32, 34, having resistance values R1 and R2, are connected to the conductors of the twisted pair and the outputs of the line driver. Resistors 32 and 34 are terminated during the receive time slot by driving the output stage of the line driver into saturation thereby providing the necessary low noise termination. A switching signal SW is applied to the inputs of transistors Q1 and Q2 which are connected to the inputs of the line driver. Capacitors C1 and C2 isolate the inputs of the line driver. A high level on SW will drive the line driver outputs into saturation at the negative rail, providing low impedance and very low noise termination of resistors 32 and 34. Receiver 36 is connected to the twisted pair for the Rx signal.

Figure 4:
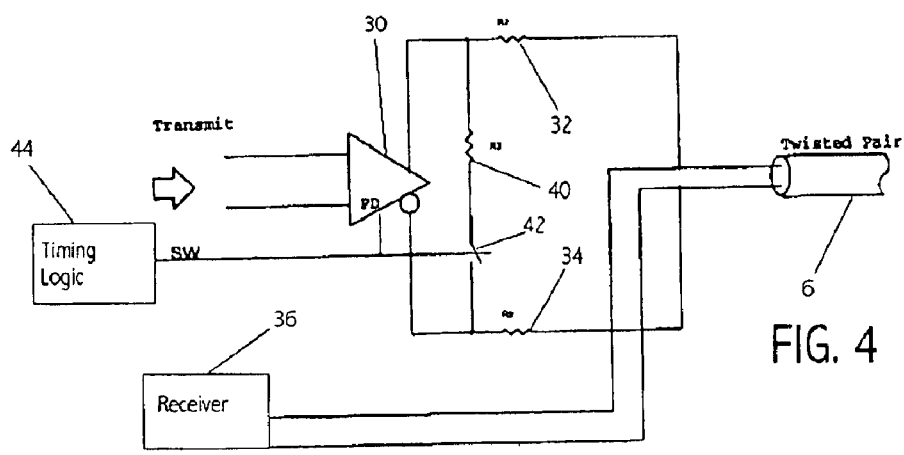
FIG. 4 is a schematic for a second embodiment for use with active termination.
Figure 5:
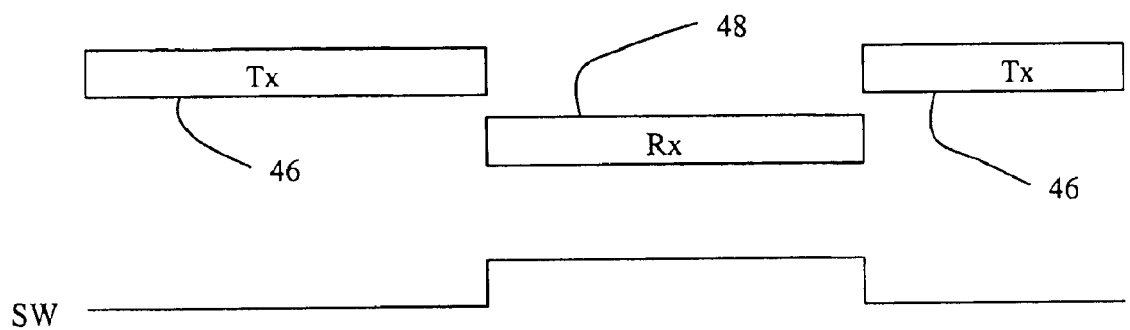
FIG. 5 is a time chart for the transmit, receive and switching signals for the present invention.

FIG. 5 demonstrates the relationship of the TDM Rx and Tx signals and the SW signal for termination of the load resistors in the modem. During the transmit time slot 46, the SW signal remains low allowing the line driver to operate in its normal function. In the receive timeslot 48, the SW signal is brought high by timing logic 44 (shown in FIGS. 3 and 4) to saturate the line driver output and provide a low noise termination of the load resistors.

In applications of the modem where active termination of the load resistors is desirable to reduce power consumption of the line driver, i.e. R1+R2<>Zo, switching to a static terminator results in an impedance mismatch. To accommodate such applications, a second embodiment of a modem employing the present invention is shown in FIG. 4. A balancing impedance created by resistor 40, having a resistance value R7 (with a nominal value of R7=Zo−(R1+R2)), is bridged across resistors 32 and 34 with a switch 42 in parallel with the line driver outputs. A line driver with the ability to float its outputs is employed in this embodiment. The switching signal SW operates the switch and is connected to the PD input of the line driver to float its outputs. In alternative embodiments, switch 42 is a relay or a CMOS transistor. Timing for the switching signal SW is as previously described with respect to FIG. 5 for the first embodiment.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A modem for a Digital Subscriber Line (DSL) employing Time-Division Multiplexing (TDM) protocol comprising:

a line driver having inputs for receiving a transmit signal and outputs for connection to a twisted pair line;

means for connecting the twisted pair line to a receiver;

load resistors coupled intermediate the line driver outputs and the receiver connecting means;

means for terminating the load resistors in a low noise termination responsive to a switching signal; and means for generating the switching signal.

2. A modem for a DSL as defined in claim 1 wherein the means for terminating the load resistors comprises a means for driving the line driver outputs into saturation.

3. A modem for a DSL as defined in claim 2 wherein the means for driving the line driver outputs into saturation comprises:

a first transistor having its drain connected to a first input of the line driver and its emitter connected to ground and its gate connected to the means for generating the switching signal;

a second transistor having its drain connected to a second input of the line driver and its emitter connected to ground and its gate connected to the means for generating the switching signal; and means for isolating the inputs of the line driver.

4. A modem for a DSL as defined in claim 1 wherein the means for terminating the load resistors comprises:

a balancing impedance interruptibly connected across the load resistors;

a switch responsive to the means for generating the switching signal for interrupting the circuit across the balancing impedance.

5. A modem for a DSL as defined in claim 1 wherein the means for generating the switching signal is a timing logic synchronous with a receive time slot of the TDM protocol.

* * * * *